(12) United States Patent
Keady

(10) Patent No.: US 12,413,892 B2
(45) Date of Patent: Sep. 9, 2025

(54) INVERTED BALLOON SYSTEM AND INFLATION MANAGEMENT SYSTEM

(71) Applicant: ST TipTeCh, LLC, Delray Beach, FL (US)

(72) Inventor: John Patrick Keady, Fairfax Station, VA (US)

(73) Assignee: ST TipTech, LLC, Delray Beach, FL (US)

(*) Notice: Subject to any disclaimer, the term of this patent is extended or adjusted under 35 U.S.C. 154(b) by 555 days.

(21) Appl. No.: 17/407,163

(22) Filed: Aug. 19, 2021

(65) Prior Publication Data

US 2021/0385569 A1 Dec. 9, 2021

Related U.S. Application Data

(63) Continuation-in-part of application No. 16/549,410, filed on Aug. 23, 2019, now Pat. No. 11,159,876, which is a continuation of application No. 15/791,038, filed on Oct. 23, 2017, now Pat. No. 10,455,315, which is a continuation of application
(Continued)

(51) Int. Cl.
*H04R 1/10* (2006.01)
*B29C 65/00* (2006.01)

(52) U.S. Cl.
CPC ......... *H04R 1/1058* (2013.01); *H04R 1/1091* (2013.01); *B29C 66/1122* (2013.01); *B29C 66/301* (2013.01); *B29C 66/5221* (2013.01); *B29C 66/532* (2013.01);
(Continued)

(58) Field of Classification Search
CPC .............. B29C 66/1122; B29C 66/301; B29C 66/5521; B29C 66/532; B29C 66/5324; B29C 66/153241; B29C 66/53245; H04R 25/00; H04R 25/60; H04R 25/608; H04R 25/65; H04R 25/652; H04R 25/656; H04R 25/658; H04R 25/456; H04R 1/10; H04R 1/1016; H04R 1/1058; H04R 1/11091; H04R 2225/023; H04R 2201/105; H04R 2460/17; Y10T 156/1051
USPC ...... 156/60, 110.1, 118, 120, 145, 146, 147, 156/196, 227, 242, 244.11, 244.13, 156/244.24, 244.27, 245, 290, 291, 292,
(Continued)

(56) References Cited

U.S. PATENT DOCUMENTS 3,876,843 A    4/1975  Moen
4,054,749 A   10/1977  Suzuki et al.
(Continued)

FOREIGN PATENT DOCUMENTS

EP      1519625 A2    3/2005
JP       309111       1/2003
WO   2006037156 A1   4/2006

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.
(Continued)

*Primary Examiner* — Philip C Tucker
*Assistant Examiner* — Brian R Slawski
(74) *Attorney, Agent, or Firm* — Akerman LLP

(57) ABSTRACT

At least one exemplary embodiment is directed to an earpiece having a swappable inflatable tip.

10 Claims, 7 Drawing Sheets

Related U.S. Application Data

No. 14/669,602, filed on Mar. 26, 2015, now Pat. No. 9,843,854, which is a continuation of application No. 12/578,461, filed on Oct. 13, 2009, now Pat. No. 8,992,710.

(60) Provisional application No. 61/103,923, filed on Oct. 8, 2008.

(52) U.S. Cl.
CPC .. *B29C 66/53245* (2013.01); *H04R 2201/105* (2013.01); *H04R 2460/17* (2013.01); *Y10T 156/1051* (2015.01)

(58) Field of Classification Search
USPC ...... 156/293, 294, 296, 308.2, 308.4, 309.6; 381/312, 322, 324, 328, 329, 330, 380
See application file for complete search history.

(56) References Cited

U.S. PATENT DOCUMENTS

| | | | |
|---|---|---|---|
| 4,088,849 A | 5/1978 | Usami et al. | |
| 4,947,440 A | 8/1990 | Bateman et al. | |
| 5,208,867 A | 5/1993 | Stites, III | |
| 5,267,321 A | 11/1993 | Langberg | |
| 5,524,056 A | 6/1996 | Killion et al. | |
| 5,903,868 A | 5/1999 | Yuen et al. | |
| 6,021,207 A | 2/2000 | Puthuff et al. | |
| 6,021,325 A | 2/2000 | Hall | |
| 6,163,338 A | 12/2000 | Johnson et al. | |
| 6,163,508 A | 12/2000 | Kim et al. | |
| 6,226,389 B1 | 5/2001 | Lemelson et al. | |
| 6,298,323 B1 | 10/2001 | Kaemmerer | |
| 6,359,993 B2 | 3/2002 | Brimhall | |
| 6,400,652 B1 | 6/2002 | Goldberg et al. | |
| 6,415,034 B1 | 7/2002 | Hietanen | |
| 6,567,524 B1 | 5/2003 | Svean et al. | |
| RE38,351 E | 12/2003 | Seberg et al. | |
| 6,661,901 B1 | 12/2003 | Svean et al. | |
| 6,728,385 B2 | 4/2004 | Kvaloy et al. | |
| 6,748,238 B1 | 6/2004 | Lau | |
| 6,754,359 B1 | 6/2004 | Svean et al. | |
| 6,804,638 B2 | 10/2004 | Fiedler | |
| 6,804,643 B1 | 10/2004 | Kiss | |
| 7,072,482 B2 | 7/2006 | Van Doorn et al. | |
| 7,107,109 B1 | 9/2006 | Nathan et al. | |
| 7,209,569 B2 | 4/2007 | Boesen | |
| 7,430,299 B2 | 9/2008 | Armstrong et al. | |
| 7,433,714 B2 | 10/2008 | Howard et al. | |
| 7,450,730 B2 | 11/2008 | Bertg et al. | |
| 7,477,756 B2 | 1/2009 | Wickstrom et al. | |
| 7,562,020 B2 | 7/2009 | Le et al. | |
| 7,756,285 B2 | 7/2010 | Sjursen et al. | |
| 7,778,434 B2 | 8/2010 | Juneau et al. | |
| 7,920,557 B2 | 4/2011 | Moote | |
| 8,014,553 B2 | 9/2011 | Radivojevic et al. | |
| 8,340,310 B2 | 12/2012 | Ambrose et al. | |
| 8,391,534 B2 | 3/2013 | Ambrose et al. | |
| 8,493,204 B2 | 7/2013 | Wong et al. | |
| 8,750,295 B2 | 6/2014 | Liron | |
| 9,037,458 B2 | 5/2015 | Park et al. | |
| 9,123,343 B2 | 9/2015 | Kurki-Suonio | |
| 9,135,797 B2 | 9/2015 | Couper et al. | |
| 2001/0046304 A1 | 11/2001 | Rast | |
| 2002/0106091 A1 | 8/2002 | Furst et al. | |
| 2002/0118798 A1 | 8/2002 | Anghart et al. | |
| 2002/0196958 A1* | 12/2002 | Halteren | H04R 25/652 381/328 |
| 2003/0161097 A1 | 8/2003 | Le et al. | |
| 2003/0165246 A1 | 9/2003 | Kvaloy et al. | |
| 2004/0042103 A1 | 3/2004 | Mayer | |
| 2004/0109668 A1 | 6/2004 | Stuckman | |
| 2004/0125965 A1 | 7/2004 | Alberth, Jr. et al. | |
| 2004/0190737 A1 | 9/2004 | Kuhnel et al. | |
| 2004/0196992 A1 | 10/2004 | Ryan | |
| 2004/0203351 A1 | 10/2004 | Shearer et al. | |
| 2005/0078838 A1 | 4/2005 | Simon | |
| 2005/0123146 A1 | 6/2005 | Voix et al. | |
| 2005/0288057 A1 | 12/2005 | Lai et al. | |
| 2006/0067551 A1 | 3/2006 | Cartwright et al. | |
| 2006/0083395 A1 | 4/2006 | Allen et al. | |
| 2006/0092043 A1 | 5/2006 | Lagassey | |
| 2006/0195322 A1 | 8/2006 | Broussard et al. | |
| 2006/0204014 A1 | 9/2006 | Iseberg et al. | |
| 2007/0043563 A1 | 2/2007 | Comerford et al. | |
| 2007/0086600 A1 | 4/2007 | Boesen | |
| 2007/0116319 A1* | 5/2007 | Hagberg | H04R 1/1016 381/328 |
| 2007/0189544 A1 | 8/2007 | Rosenberg | |
| 2007/0291953 A1 | 12/2007 | Ngia et al. | |
| 2008/0037801 A1 | 2/2008 | Alves et al. | |
| 2008/0165988 A1 | 7/2008 | Terlizzi et al. | |
| 2008/0253594 A1* | 10/2008 | Rasmussen | H04R 25/453 381/312 |
| 2009/0010456 A1 | 1/2009 | Goldstein et al. | |
| 2009/0024234 A1 | 1/2009 | Archibald | |
| 2010/0061564 A1 | 3/2010 | Clemow et al. | |
| 2010/0071708 A1* | 3/2010 | Lenhardt | A61F 11/08 128/868 |
| 2010/0296668 A1 | 11/2010 | Lee et al. | |
| 2011/0096939 A1 | 4/2011 | Ichimura | |
| 2011/0264447 A1 | 10/2011 | Visser et al. | |
| 2011/0293103 A1 | 12/2011 | Park et al. | |
| 2016/0104452 A1 | 4/2016 | Guan et al. | |
| 2016/0295311 A1 | 10/2016 | Keady | |
| 2018/0220239 A1 | 8/2018 | Keady | |
| 2019/0174219 A1 | 6/2019 | Perez et al. | |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

* cited by examiner

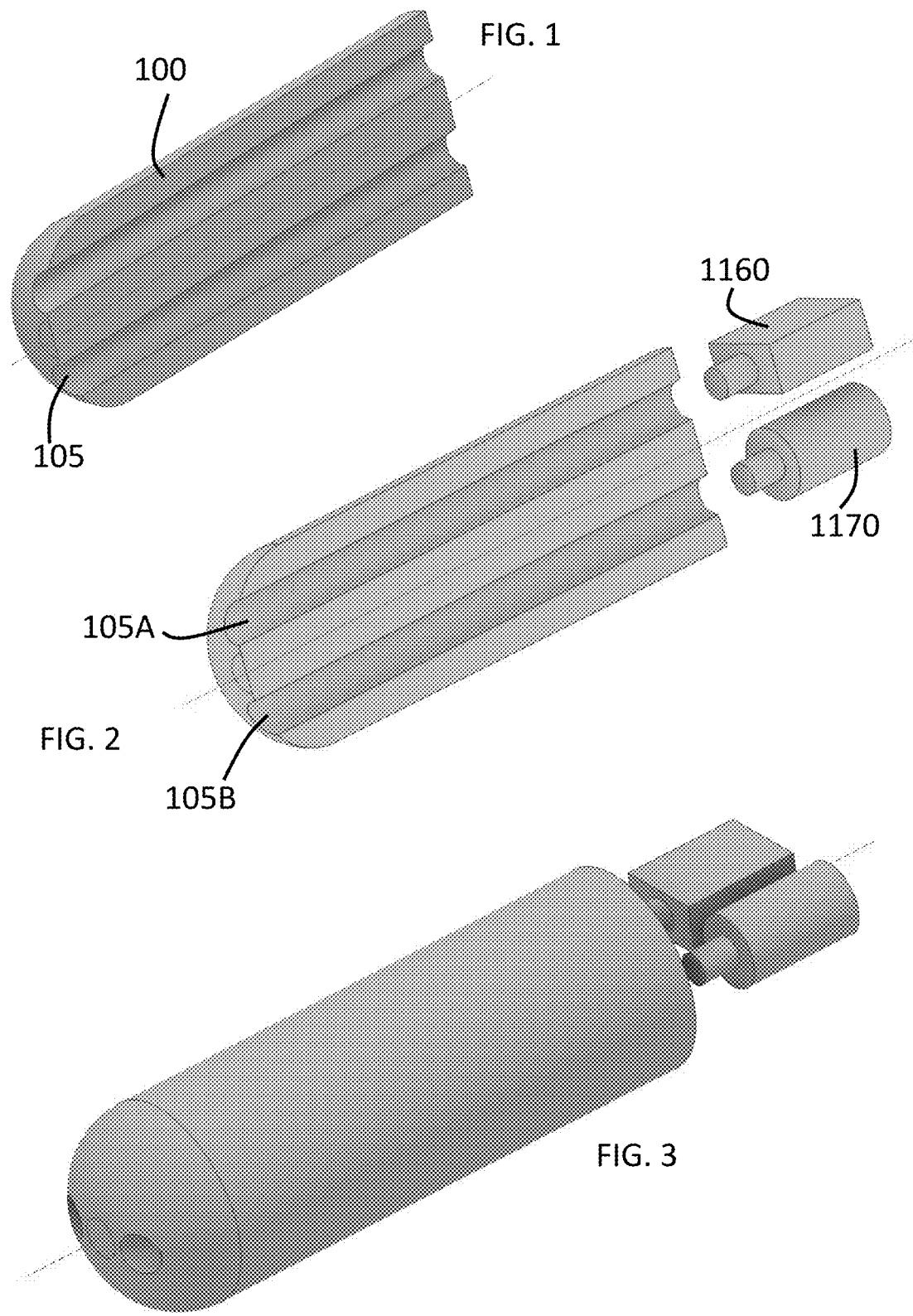

INVERTED BALLOON SYSTEM AND INFLATION MANAGEMENT SYSTEM

CROSS-REFERENCE TO RELATED APPLICATIONS

This application is a continuation in part of and claims priority to U.S. application Ser. No. 16/549,410 filed on 23 Aug. 2019, which is a continuation of U.S. application Ser. No. 15/791,038 filed on 23 Oct. 2017 which is a continuation of U.S. application Ser. No. 14/669,602 filed on 26 Mar. 2015 which is a continuation of Ser. No. 12/578,461 filed 13 Oct. 2009 (U.S. Pat. No. 8,992,710 issued 31 Mar. 2015) and further claims the benefit of U.S. provisional patent application No. 61/103,923 filed 8 Oct. 2008. The disclosure of the aforementioned applications are incorporated herein by reference in their entirety.

FIELD OF THE INVENTION

The embodiments relate in general to pressure management and balloon bonds, and particularly though not exclusively, is related to creating a pressure management system for earpiece systems.

BACKGROUND

Inflatable acoustic systems using balloons can have difficulties in maintaining the bonding of a balloon to a stent upon insertion. In addition, there is no pressure management system that has been designed for an inflatable earpiece.

SUMMARY

At least one exemplary embodiment is directed to a method of invert bonding of a balloon comprising: bonding a sheath balloon to a stent at a first bond location, where the sheath balloon has first surface and a second surface, where the bonding at the first bond location is between the stent and a portion of the first surface, where the first surface faces the stent; pulling the sheath balloon from an unbounded end over the first bond to a chosen second bond location so that the first surface faces away from the stent forming an inverted bond at the first bond location; and bonding the sheath at the second bond location where the bonding at the second bond location is between the stent and a portion of the second surface.

At least one exemplary embodiment is directed to a method of forming an inverted bond balloon comprising: aligning a mold core with a first and a second mold shell, where the first shell has an injection port, where the first and second mold shell and the mold core are aligned using alignment recesses and pins, where when the mold core is aligned there is a gap between a portion of the mold core and the first and second mold shells, where the gap is designed to be related to a molded balloon thickness; aligning the injection port with an injection nozzle; clamping a mold against an injection nozzle; inserting a flexible material into the mold through the injection port of the mold; removing the mold from the injection nozzle; curing the material in the mold, where curing can be at least one of cooling, UV illumination, and chemical reaction; and opening the mold and removing a molded balloon with at least one inverted bond, where the molded balloon is configured so that when attached to a stent and inflated the inverted bond presses against a stent.

At least one exemplary embodiment is directed to an inverted bond balloon stent comprising: a balloon bonded to a stent, where the balloon has at least one end of the balloon inverted bonded to the stent; and a stent, where the stent is configured to provide one of air and liquid to the balloon.

At least one exemplary embodiment is directed to a pressure management system for an earpiece comprising: a first valve, where the first valve allows air to pass from a first side of the valve to a second side more readily than from the second side to the first side; an inflation channel, where the inflation channel has an outer diameter less than 5 mm; a pressure release mechanism; a pump; a stent, where the inflation channel is embedded; and a balloon, where the first valve, the inflation channel, the pressure release mechanism, the pump, and the balloon are operatively connected, where the first valve is positioned so that air from the pump passes through the first valve to inflate the balloon and where the leak rate of the air from the balloon back to the pump is less than 1% by volume per minute and where the pressure release mechanism is configured to release pressure from the balloon to the environment upon actuation, and where the pressure management system is configured to manage the inflation pressure of the balloon in an orifice.

BRIEF DESCRIPTION OF THE DRAWINGS

Exemplary embodiments of present invention will become more fully understood from the detailed description and the accompanying drawings, wherein:

FIGS. 1 through 6 illustrate a method of bonding a balloon sheath to a stent to form an inverted bond in accordance with at least one exemplary embodiment;

DETAILED DESCRIPTION OF EXEMPLARY EMBODIMENTS OF THE PRESENT INVENTION

Figure 4:
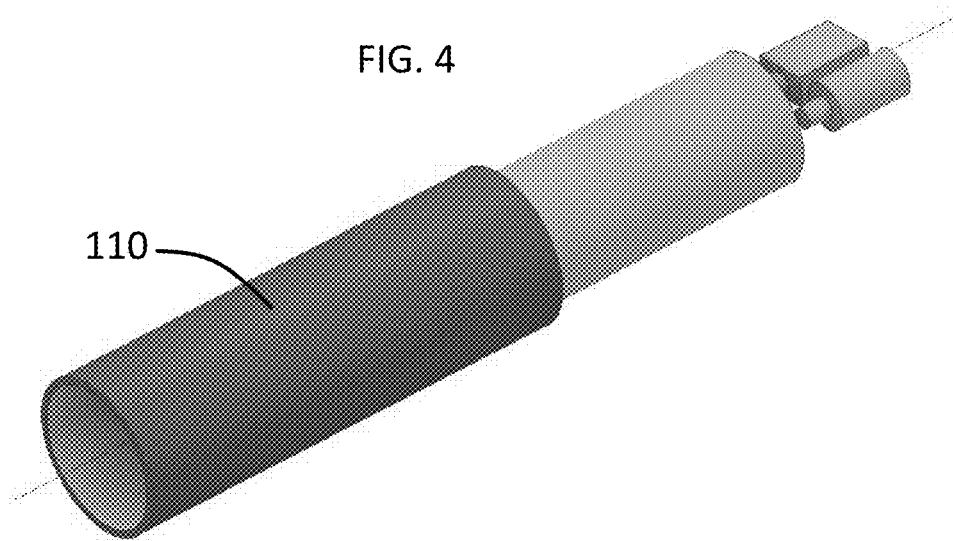
Figure 5:
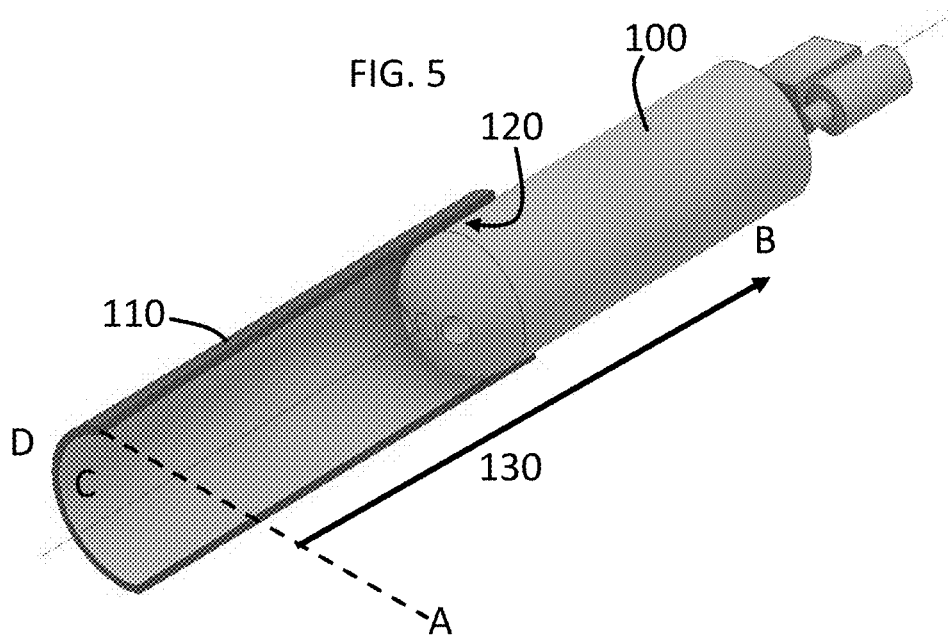

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, specific computer code may not be listed for achieving each of the steps discussed, however one of ordinary skill would be able, without undo experimentation, to write such code given the enabling disclosure herein. Such code is intended to fall within the scope of at least one exemplary embodiment.

Additionally, the sizes of structures used in exemplary embodiments are not limited by any discussion herein (e.g., the sizes of structures can be macro (centimeter, meter, and size), micro (micro meter), nanometer size and smaller).

Notice that similar reference numerals and letters refer to similar items in the following figures, and thus once an item is defined in one figure, it may not be discussed or further defined in the following figures.

In all of the examples illustrated and discussed herein, any specific values, should be interpreted to be illustrative only and non-limiting. Thus, other examples of the exemplary embodiments could have different values.

Additionally various materials can be used for inflations channels, stents, acoustic channels, valves, balloons and pressure release mechanism. The stent, valves, inflation channels, and balloons can use a material that has a low permeability to the medium in the balloon. For example, Teflon can be used for an air medium. The type of material will be governed by the design criteria. For example, a flexible material that has an air permeability of less than 5% loss of volume in 6 hours is SARLINK™.

Figure 6:
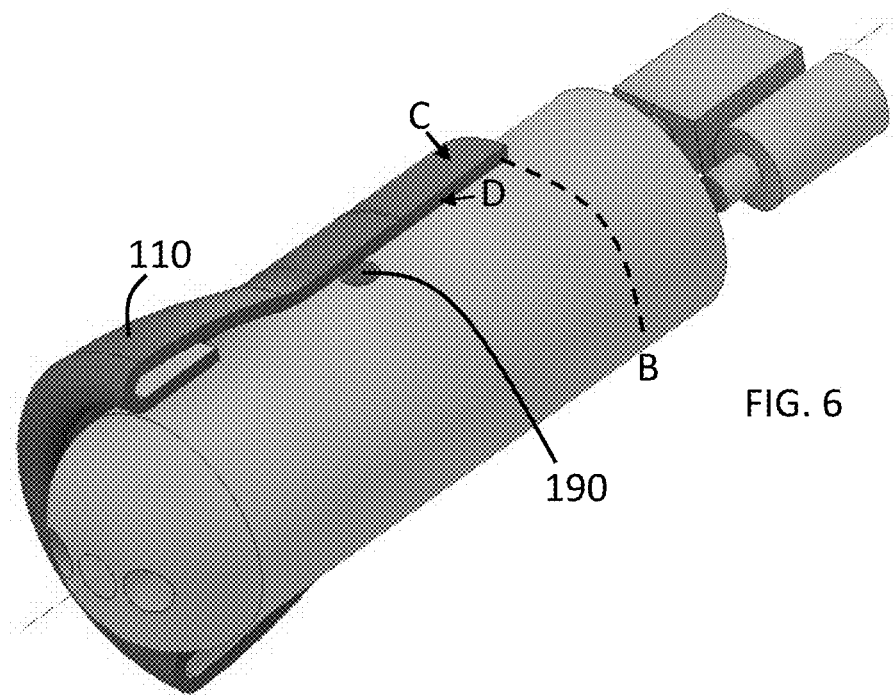

FIGS. 1 through 6 illustrate a method of bonding a balloon sheath to a stent to form an inverted bond in accordance with at least one exemplary embodiment. FIGS. 1, 2, and 3 illustrate various views of a stent 100 upon which the sheath balloon 110 can be bonded, where FIGS. 1 and 2 are cross sectional images. The stent 100 can have lumen 105, 105A, and 105B, that can be attached to speaker(s) 1160 and microphone(s) 1170. For example lumen 105A can be connected at one end to speaker 1160, while lumen 105B can be connected to microphone 1170. At least one exemplary embodiment is directed to a method of invert bonding of a balloon comprising: bonding a sheath balloon 110 (e.g., of SARLINK™ or other materials that have a low permeability to the medium (air and liquid) in the balloon) to a stent 100 (e.g., which can be made of the same material as the balloon and which can also have a low permeability (e.g., loss of medium by volume is less than 3% in a 16 hour period) at a first bond location 120 (e.g., at the stent tip and extending inward a distance for example about 1 mm), where the sheath balloon has first surface and a second surface, where the bonding (e.g., adhesive bonding, thermal bonding, UV curing bonding, or molding the balloon and stent as one piece) at the first bond location is between the stent and a portion of the first surface, where the first surface faces the stent (FIGS. 1 and 2, where the stent 100 can have an acoustic channel 105); pulling (e.g., pulling from A in the direction of 130) the sheath balloon 110 from an unbounded end over the first bond (e.g. located at 120) (from A to B, FIGS. 5 and 6) to a chosen second bond (e.g., 170) location (B) (FIG. 6) so that the first surface faces away from the stent forming an inverted bond at the first bond location; and bonding the sheath at the second bond location where the bonding (170, FIG. 7) at the second bond location is between the stent and a portion of the second surface. After the sheath balloon/membrane 110 is bonded (e.g., at 120), is can be pulled so that at end A, the inside surface C and outer surface D are reversed when pulled to location B (FIG. 6). An inflation hole (190) connected to inflation lumen 195, can be used to inflate the membrane 110 to form an expanded membrane 155.

Figure 7:
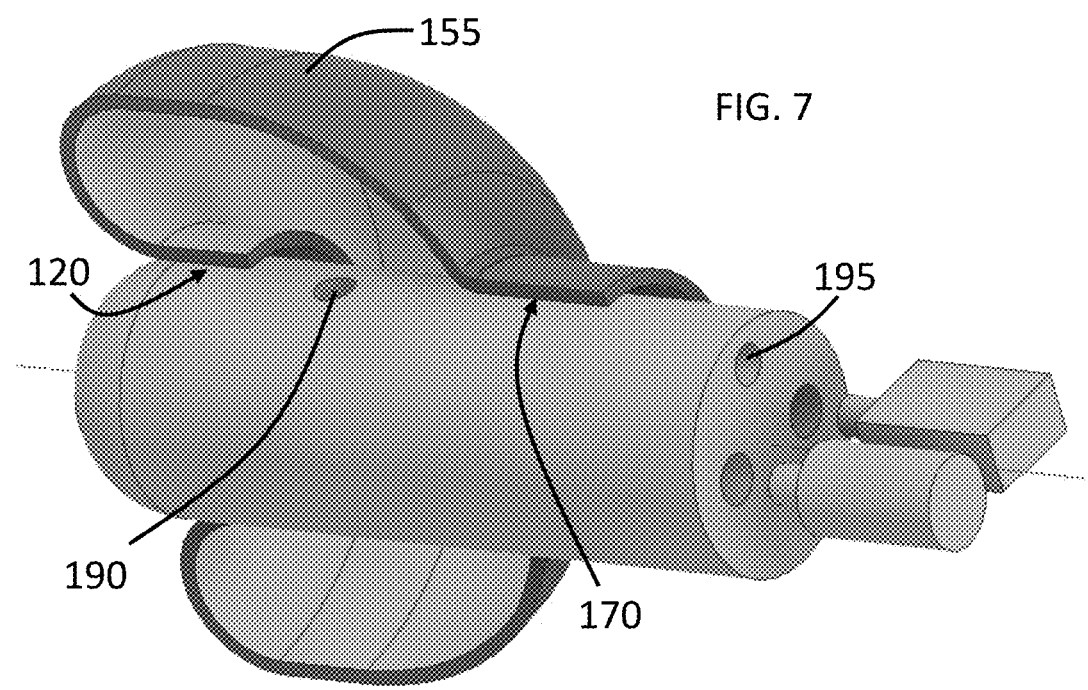
FIG. 7 illustrates an inflated balloon having an inverted bond in accordance with at least one exemplary embodiment.

Note the bond strengths are such that various balloon pressures can be maintained. For example an internal gauge pressure between 0.05 bar to 3 bar. FIG. 7 illustrates an inflated balloon 155, expanded in accordance to at least one exemplary embodiment. Note that the tip is nearly obscured (the forward portion of the inflated balloon can vary in length, it can extent completely over (e.g. align with the tip or extent over several mms) the tip (through which 105 is shown) to recessed (e.g., 1 mm from the tip) in the radial direction from the expanding balloon.

Figure 8:
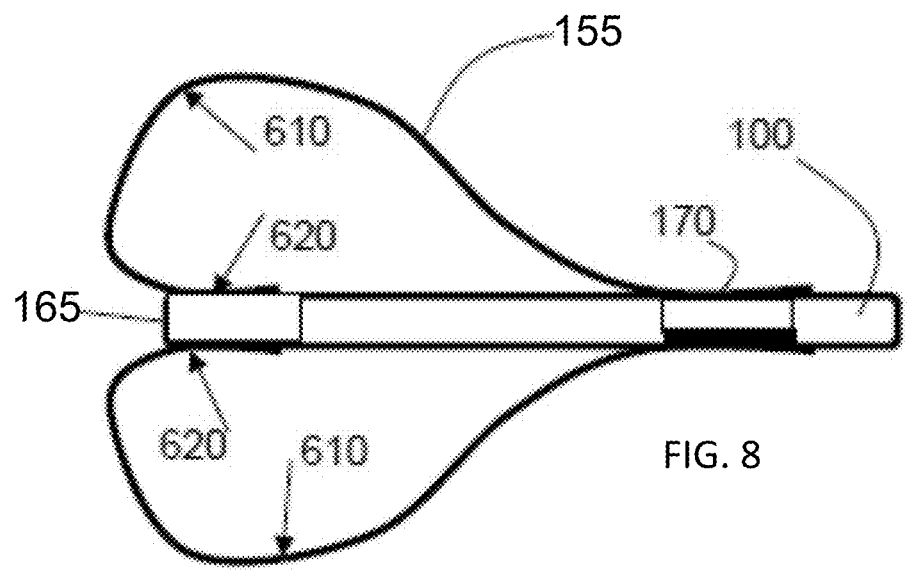
FIG. 8 illustrates the restoring force associated with an inverted bond of a balloon in accordance with at least one exemplary embodiment.

FIG. 8 illustrates how an inflated balloon with an inverted bond has the pressure presses the bond (e.g., 620) to the stent rather than try and separate the balloon from the stent as the exterior pressure (610) would do if there were not an inverted bond. This allows some force to be exerted along and/or radial to the stent on the balloon 155 at the bonding site 120 near the tip 165 of the stent 100. Note in FIG. 8 only one inverted bond is shown (e.g., bond 170 is not an inverted bond), however at least one exemplary embodiment has bond 170 also replaced with an inverted bond, in such a situation the sheath would be moved from B to A slightly and the B end flipped to form an inverted bond.

Figure 9:
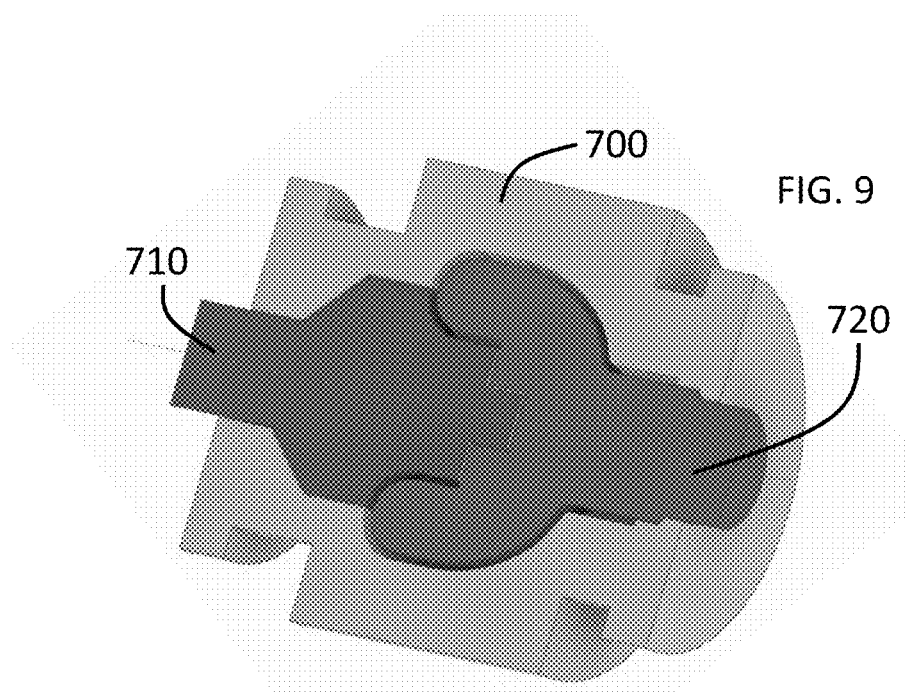
FIG. 9 illustrate a core mold associated with the molding of a balloon with an inverted bond in accordance with at least one exemplary embodiment.
Figure 10:
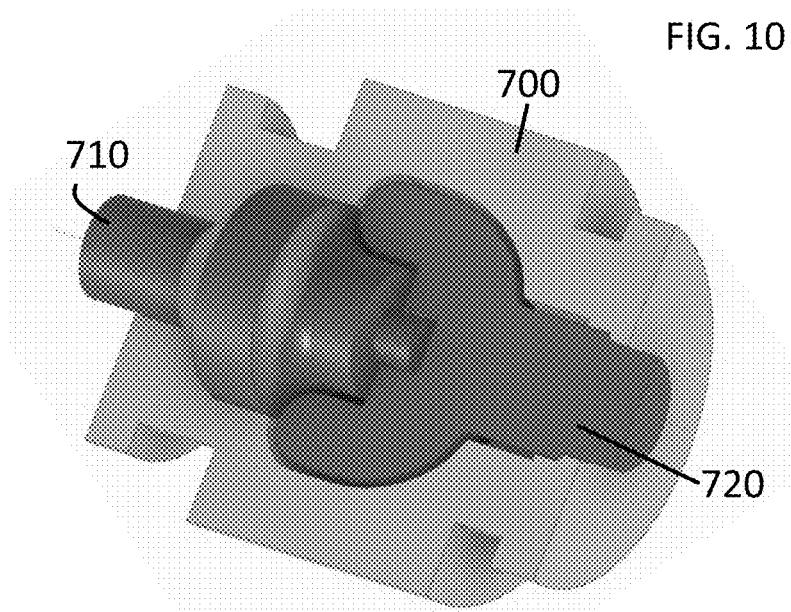
FIG. 10 illustrates the core mold inserted into one shell mold in accordance with at least one exemplary embodiment.
Figure 11:
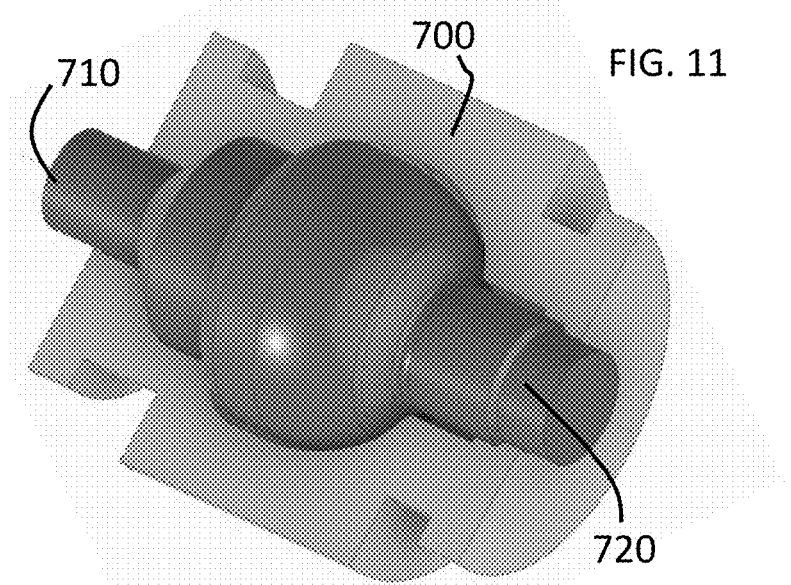
FIG. 11 illustrates a core mold inserted into two shell molds in accordance with at least one exemplary embodiment.

In addition to bonding a sheath balloon on a stent to form an inverted bond, an inverted bond can be molded (see FIGS. 9, 10, and 11).

FIGS. 9, 10, and 11 illustrate a mold that can be used in a method of forming an inverted bond balloon. FIG. 9 illustrates a cross section of the core pin composed of two parts 710 and 720, while 700 is a shell within which the core pin is placed. Thus there are two shells 700 for a completed mold. FIG. 10 illustrates a cross section for the first part 720 of the core pin while the second part 710 is illustrated in it's actual shape. FIG. 11 illustrates both core parts, 710 and 720, in their actual shape, placed within the mold shell 700. For a completed mold, another shell 700 would be placed on top. At least one exemplary embodiment of a method of molding a balloon with an inverted bond comprises: aligning a mold core with a first and a second mold shell (700 shows only one of the duplicate shells), where the shell can have an injection port, where the first and second mold shell and the mold core (710 and 720) are aligned using alignment recesses into which the ends of the parts of the core pin fit snuggly (710A, 720A), where when the mold core is aligned there is a gap between a portion of the mold core and the first and second mold shells, where the gap (730) is designed to be related to a molded balloon thickness (e.g., 0.1 mm-0.6 mm); aligning an optional injection port 760 with an injection nozzle; clamping a mold against an injection nozzle; inserting a flexible material into the mold through the injection port of the mold; removing the mold from the injection nozzle; curing the material in the mold, where curing can be at least one of cooling, UV illumination, and chemical reaction; and opening the mold and removing a molded balloon with at least one inverted bond, where the molded balloon is configured so that when attached to a stent and inflated the inverted bond presses against a stent.

Note that the gap 730 can be variable throughout the mold allowing one to mold variable thickness balloons. For example a region of the balloon that one would want to expand first can be thinner than another part of the balloon. Note that the material that can be used for molding can (besides satisfying the design permeability requirement set during design) be flexible. Note that the flexible material can have a linear elongation of greater than 100% without deformation of more than 5% in the area of the balloon when deflated. Some sample materials are SARLINK™, latex, and silicone and the like.

As noted previously, the stent 100 can be connected to microphones, where some can sample the ambient environment (ASM 1150), some sampling the ear canal (ECM, 1170) and receivers, some playing acoustic energy into the ear canal (ECR 1160). Note various microphones and receivers can be used, for example Knowles MEM microphones, TO and FG microphones, and TWFK receivers.

Figure 12:
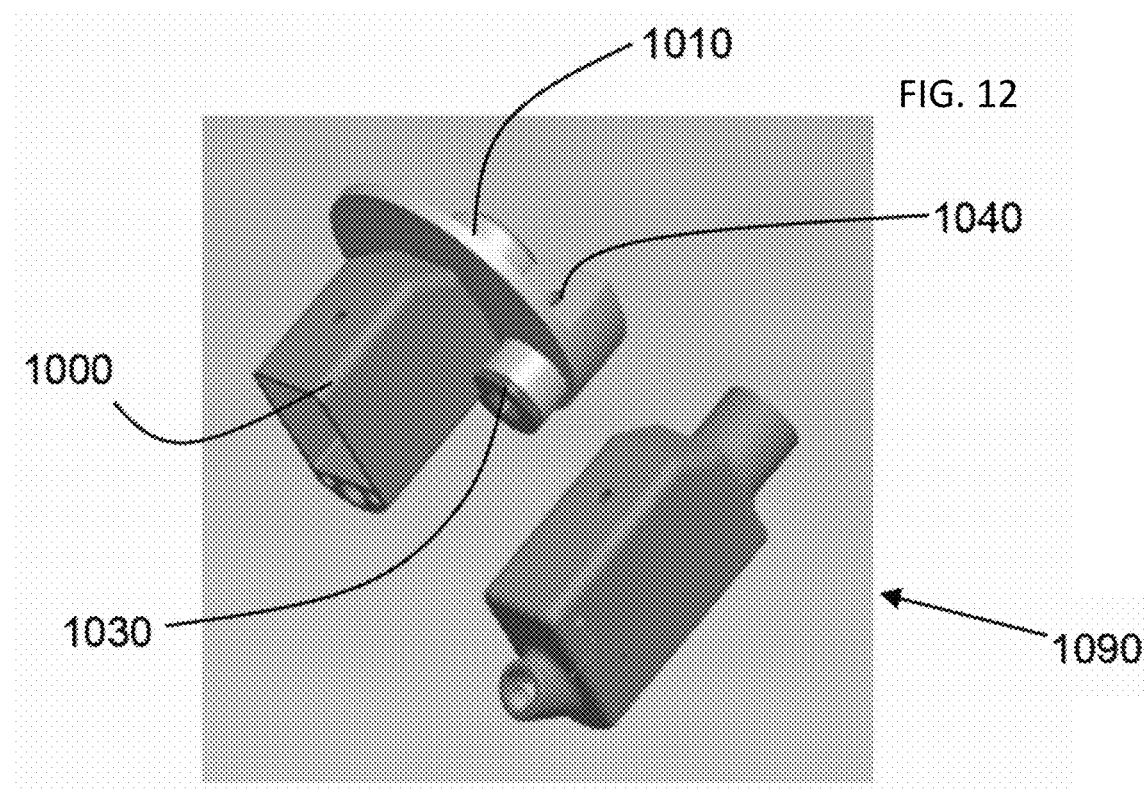
FIG. 12 illustrates a pressure management system also referred to as an inflation management system (IMS) in accordance with at least one exemplary embodiment.
Figure 13:
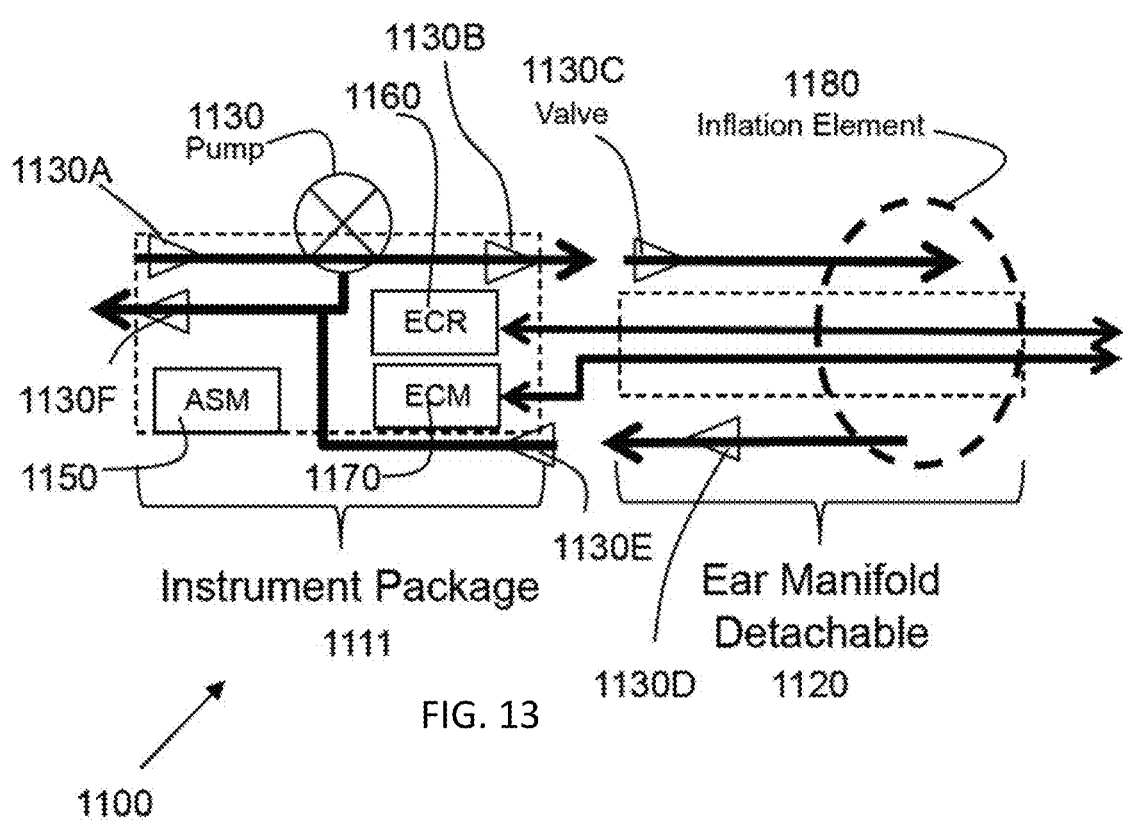
FIG. 13 illustrates a block diagram of an IMS system using a manual pump in accordance with at least one exemplary embodiment.
Figure 14:
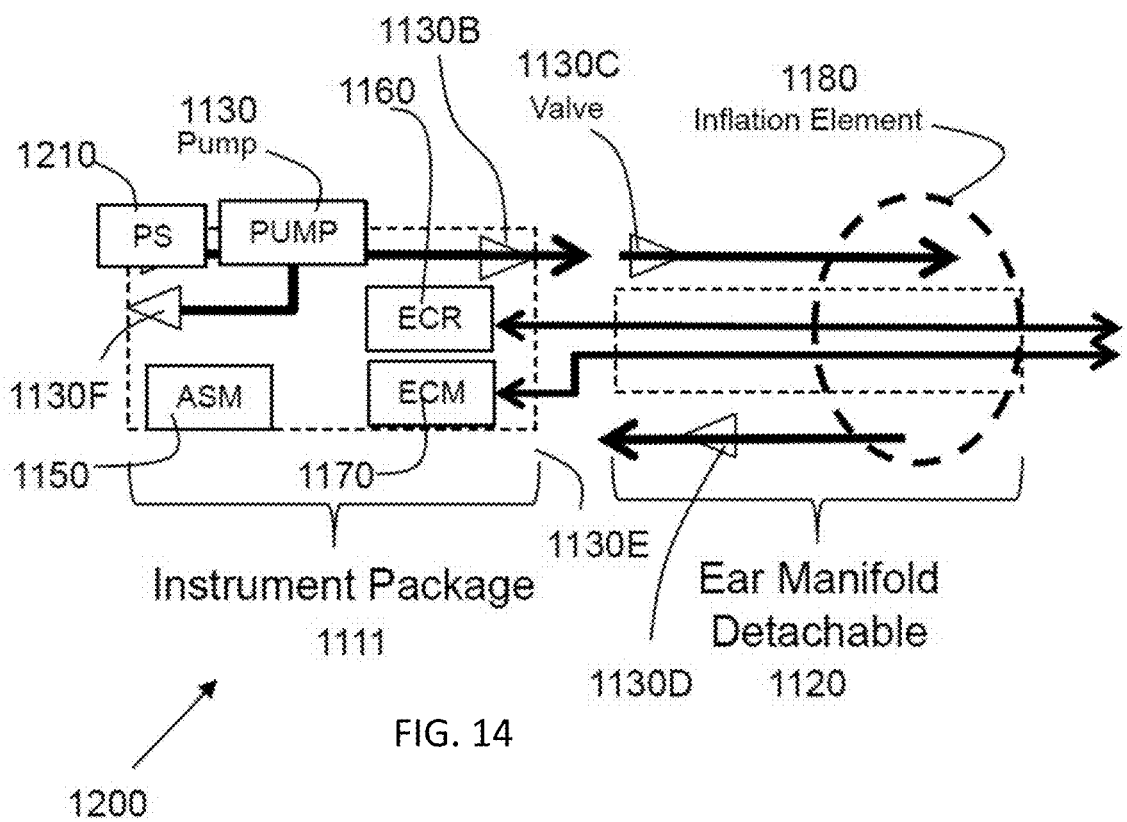
FIG. 14 illustrates a block diagram of an IMS system using an automated pump in accordance with at least one exemplary embodiment.

FIGS. 12 through 14 illustrate inflation management systems (also referred to as pressure management systems) in accordance with at least a few exemplary embodiments. For example at least one exemplary embodiment is directed to a pressure management system (e.g., 1090, 1100, 1200) for an earpiece (e.g., a device that is designed to be used with any part of the ear) comprising: a first valve (e.g., duck valves, one way valves, 1030, 1130A-1130F), where the first valve allows air to pass from a first side of the valve to a second side more readily than from the second side to the first side; an inflation channel, where the inflation channel has an outer diameter less than the size of an orifice in which it is to be inserted (e.g., <5 mm); a pressure release mechanism (e.g., a pin to push open the valve 1030); a pump (e.g., a manual pump (e.g., bladder), automatic pump (e.g., linear actuator) a stent, where the inflation channel is embedded; and a balloon, where the first valve, the inflation channel, the pressure release mechanism, the pump, and the balloon are operatively connected, where the first valve is positioned so that air from the pump passes through the first valve to inflate the balloon and where the leak rate of the air from the balloon back to the pump is less than 1% by volume per minute and where the pressure release mechanism is configured to release pressure from the balloon to the environment upon actuation, and where the pressure management system is configured to manage the inflation pressure of the balloon in an orifice. Note that the stent can be as large as the inflation tube or larger.

Note that at least one exemplary embodiment can include a second valve to release pressure when the pressure in the balloon exceeds a design threshold (e.g., between 0.05 bar gauge to 3 bar gauge).

Note also that FIGS. 13 and 14 illustrate detachable stents and balloon systems (ear manifold 1120) from the remaining elements (instrument package 1111). A valve in the stent 1130C can allow the one way passage of medium into the balloon (e.g., inflation element 1180). A second valve 130D can release pressure if it gets above a certain value. For example if the gauge pressure exceeds 0.25 bar gauge. Note that the pump can also be connected to a release valve 1130F. For an automated pump a power source 1210 (e.g. battery) can power the pump 1130, or can be manual.

Figure 15:
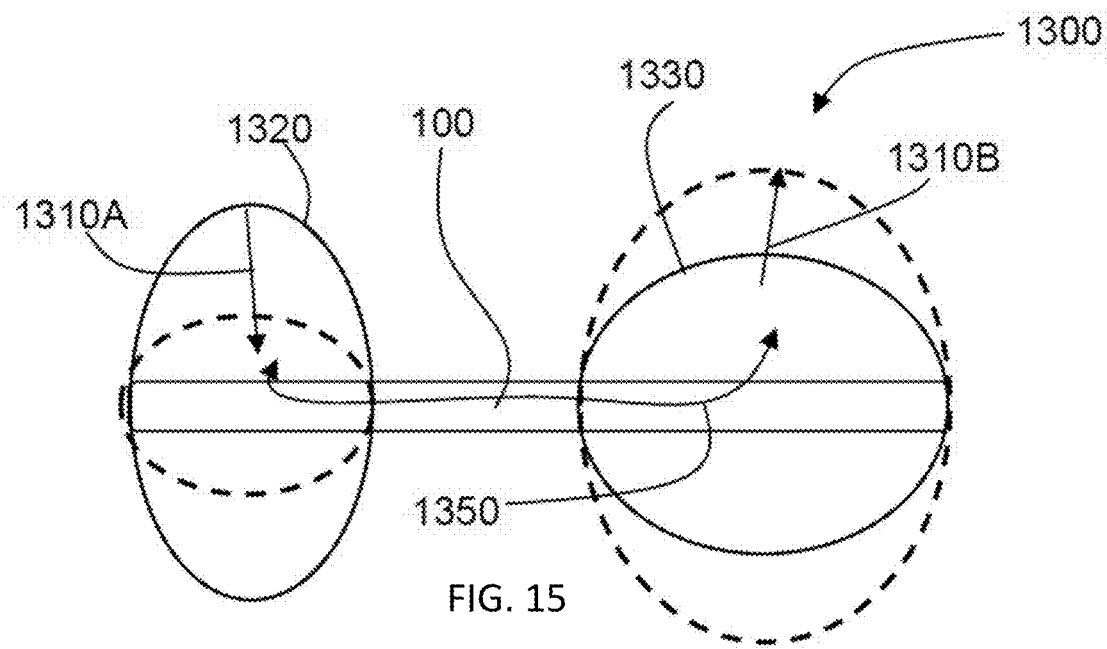
FIG. 15 illustrates a diagram of a restoring membrane based IMS in accordance with at least one exemplary embodiment.

FIG. 15 illustrates a restoring membrane exemplary embodiment, where an inflated balloon 1330, when pressed (e.g., via ear canal wall) exerts pressure on a restoring membrane 1320. The restoring membrane can provide a restoring force 1310A, which is felt by the balloon 1310B so that when the balloon is no longer pressed it will expand back to an equilibrium position. The restoring membrane can be one that has a higher elastic elongation than the balloon material, or be thinner. The restoring membrane and balloon can be pneumatically coupled 1350 through the stent 100.

Note that an earpiece can include an Ambient Sound Microphone (ASM) to capture ambient sound, an Ear Canal Receiver (ECR) to deliver audio to an ear canal and an Ear Canal Microphone (ECM) to capture and assess a sound exposure level within the ear canal. The earpiece can partially or fully occlude the ear canal to provide various degrees of acoustic isolation. In at least one exemplary embodiment, assembly is designed to be inserted into the user's ear canal, and to form an acoustic seal with the walls of the ear canal at a location between the entrance to the ear canal and the tympanic membrane (or ear drum). In general, such a seal is typically achieved by means of the balloon.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed:

1. An earpiece comprising:
an instrument package, wherein the instrument package includes at least one microphone and a speaker, wherein the instrument package includes a pump coupled to a pneumatic tube, wherein the pneumatic tube includes a deformable third valve; and
a detachable ear manifold, where the ear manifold includes an inflation element and a first valve and a second valve, wherein the instrument package is configured to be attached to the ear manifold, and wherein the ear manifold is configured to be pneumatically separate from the instrument package when the ear manifold is detached from the instrument package, wherein the inflation element is coupled to an inflation tube, wherein when the ear manifold is attached to the instrument package the inflation tube is coupled to the pneumatic tube, wherein the first valve and second valve are configured so that when the inflation element is inflated using the pump and the instrument package is removed from the ear manifold the inflation element remains inflated.

2. The earpiece according to claim 1, where the inflation element is composed of a flexible material.

3. The earpiece according to claim 2, wherein the ear manifold includes a stent.

4. The earpiece according to claim 3, wherein the inflation element is bonded to the stent by an inverted bond.

5. The earpiece according to claim 4, wherein the stent includes a lumen associated with an inflation hole.

6. The earpiece according to claim 1, wherein the instrument package includes a power source.

7. The earpiece according to claim 1, wherein the instrument package includes a first microphone and a second microphone.

8. The earpiece according to claim 7, wherein the instrument package includes a first valve.

9. The earpiece according to claim 8, wherein the instrument package includes a second valve.

10. The earpiece according to claim 7, wherein the first microphone is an ear canal microphone and the second microphone is an ambient sound microphone, where the first microphone is configured to measure sound from a user's ear canal when the earpiece is used.

* * * * *